(12) United States Patent
Eros

(10) Patent No.: US 6,443,468 B1
(45) Date of Patent: Sep. 3, 2002

(54) STROLLER ASSEMBLY HAVING A WHEEL BRAKE

(75) Inventor: Peter F. Eros, Vandalia, OH (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 09/672,556

(22) Filed: Sep. 28, 2000

(51) Int. Cl.[7] .................................................. B62B 7/00
(52) U.S. Cl. .................................................. 280/47.38
(58) Field of Search ........................ 280/47.38, 33.994, 280/650, 642, 647, 648, 649; 188/20, 31, 1.12

(56) References Cited

U.S. PATENT DOCUMENTS

| | | | |
|---|---|---|---|
| 1,281,530 A | * 10/1918 | De Soto | 180/194 |
| 1,671,774 A | * 5/1928 | McIntosh | 16/35 R |
| 2,988,175 A | * 6/1961 | West | 188/31 |
| 5,368,133 A | * 11/1994 | Yang | 188/1.12 |
| 5,370,408 A | 12/1994 | Eagan | 280/33.994 |
| 5,373,917 A | 12/1994 | Kamman | 188/1.12 |
| 5,590,896 A | 1/1997 | Eichhorn | 280/642 |
| 5,617,934 A | * 4/1997 | Yang | 188/1.12 |
| 5,660,435 A | 8/1997 | Eichhorn | 297/219.12 |
| 5,669,624 A | 9/1997 | Eichhorn | 280/642 |
| 5,765,665 A | * 6/1998 | Cheng et al. | 188/20 |
| 5,967,535 A | 10/1999 | King | 280/47.38 |
| 6,022,042 A | * 2/2000 | Hartenstine | 280/642 |
| 6,035,975 A | 3/2000 | Loewenthal | 188/2 F |
| 6,079,724 A | * 6/2000 | Lin | 280/221 |
| 6,170,615 B1 | * 1/2001 | Cheng | 188/20 |
| 6,298,949 B1 | * 10/2001 | Yang et al. | 188/20 |
| 6,308,805 B1 | * 10/2001 | Lan | 188/20 |

FOREIGN PATENT DOCUMENTS

DE  4226090 A  * 2/1994  ............... 188/1.12

* cited by examiner

Primary Examiner—Brian L. Johnson
Assistant Examiner—G B Klebe
(74) Attorney, Agent, or Firm—Thompson Hine LLP

(57) ABSTRACT

A stroller assembly includes a stroller frame, an axle coupled to the frame, a stroller wheel, and a brake assembly. The wheel is rotatable about the axle and has a hub portion with a radially-aligned hub slot. The brake assembly has a cam and a radially-movable pin. The cam is non-rotatably attached to the axle and has a protrusion. The pin is aligned parallel to the axle, is positioned to follow the cam, and has a first end which is positioned to radially move into and out from the hub slot.

13 Claims, 3 Drawing Sheets

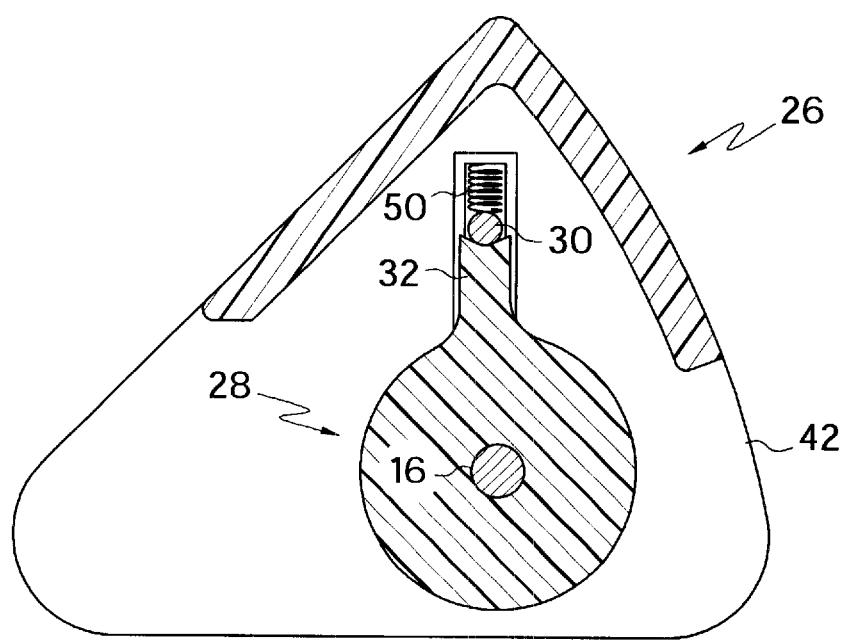
FIG. 5
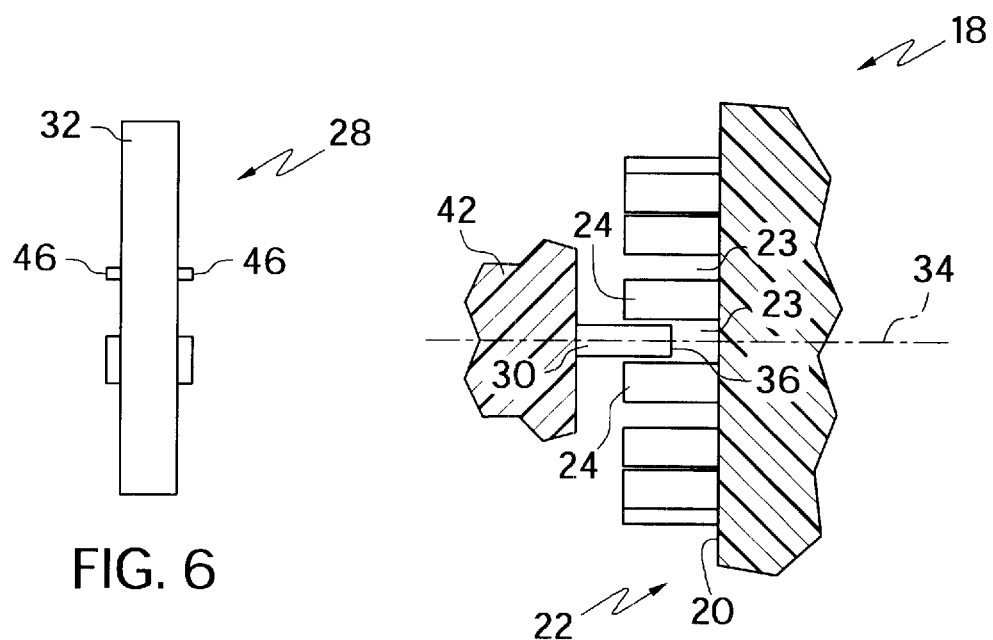
FIG. 6
FIG. 7

STROLLER ASSEMBLY HAVING A WHEEL BRAKE

BACKGROUND OF THE INVENTION

The present invention relates generally to strollers, and more particularly to a stroller assembly having a wheel brake.

Strollers are used to transport babies, infants, and young children. A stroller includes various components such as a stroller frame, an axle coupled to the frame, a stroller wheel attached to the axle, and a brake assembly to lock the wheel against rotation. In some constructions the wheel rotates with the axle, and in other constructions the wheel rotates about the axle.

Conventional stroller brake assemblies have included several designs. In a first design, a stroller brake system includes a wheel having brake nubs and a brake lever having a brake pinion. A person would use their foot to press down on the brake lever to push the brake pinion into engagement between two brake nubs locking the wheel against rotation, and the person would use their foot under the brake lever to lift up the brake lever to lift the brake pinion out from engagement from between the two brake nubs. In a second design, a stroller wheel brake mechanism includes a pivoting foot pedal which rotates a cam which moves a sharp tip of a cam follower axially between a pair of angularly spaced ribs on the wheel to lock the wheel against rotation. In a third design, when the brake pedal is depressed, a pin extending outwardly from the brake pedal engages radial teeth on the inner center hub to lock the wheel and prevent it from rotating. In a fourth design, a foot pedal is rotated about an axis which is parallel to, but spaced apart from, the wheel axle. The rotating foot pedal rotates an attached brake lever projection into engagement between two adjacent radially-spaced-apart ribs on the wheel locking the wheel against rotation. In a fifth design, an actuation lever pivots a brake member about an axis parallel to, but spaced apart from, the wheel axle. The brake member has a longitudinal projection. The rotating brake member rotates the longitudinal projection into engagement in a gap between two adjacent rib extensions a cog wheel of the stroller wheel. The various designs suffer from one or more problems such as a lack of a foot actuation pedal, an inability of a single foot pedal to actuate the brakes on two wheels, a requirement of strength to engage a pinion in an undersized gap between two adjacent ribs, an awkward engagement of a pin between two adjacent ribs wherein the pin may catch on the side of a rib, and an undesirable lever engagement against the wheel circumference to lock the wheel.

What is needed is a stroller assembly having a wheel brake which avoids the above-mentioned problems found in the wheel brakes of conventional stroller designs.

SUMMARY OF THE INVENTION

A first expression of a preferred embodiment of the invention is for a stroller assembly having a stroller frame, an axle coupled to the frame, a stroller wheel, and a brake assembly. The stroller wheel is rotatable about the axle, wherein the wheel has a hub portion, and wherein the hub portion includes a radially-aligned hub slot. The brake assembly includes a cam and a radially-movable pin. The cam is non-rotatably attached to the axle and has a protrusion. The pin has a longitudinal axis aligned substantially parallel to the axle, is positioned to follow the cam, and has a first end which is disposed to radially move into and out from the hub slot. Rotation of the cam causes the pin to outwardly follow the protrusion and move radially outward to a first position. Counter-rotation of the cam causes the pin to inwardly follow the protrusion and move radially inward to a second position. The first position is one of an engagement position and a disengagement position, and the second position is the other of the engagement position and the disengagement position. The engagement position is a position in which the pin is radially engaged in the hub slot to lock the wheel against rotation about the axle. The disengagement position is a position in which the pin is radially disengaged from the hub slot to allow the wheel to rotate about the axle.

A second expression of a preferred embodiment of the invention is for a stroller assembly having a stroller frame, an axle coupled to the stroller frame, a stroller wheel, and a brake assembly. The stroller wheel is rotatable about the axle, wherein the wheel has a first side with a hub portion, and wherein the hub portion includes radially-spaced-apart and radially-aligned ribs. The brake assembly includes a cam and a radially-movable pin. The cam is non-rotatably attached to the axle and has a protrusion. The first side of the wheel faces toward the cam. The pin has a longitudinal axis aligned substantially parallel to the axle, is disposed to follow the cam, and has a first end which is disposed to longitudinally overextend the ribs. Rotation of the cam causes the pin to outwardly follow the protrusion and move radially outward to a first position which is radially beyond the ribs to allow the wheel to rotate about the axle. Counter-rotation of the cam causes the pin to inwardly follow the protrusion and move radially inward to a second position which is between two adjacent ribs to lock the wheel against rotation about the axle.

A third expression of a preferred embodiment of the invention is for a stroller assembly having a stroller frame, an axle coupled to the stroller frame, a stroller wheel, a brake assembly, a housing, and a spring. The stroller wheel is rotatable about the axle, wherein the wheel has a first side with a hub portion, and wherein the hub portion includes radially-spaced-apart and radially-aligned ribs. The brake assembly includes a cam and a radially-movable pin. The cam is non-rotatably attached to the axle and has a protrusion. The first side of the wheel faces toward the cam. The pin has a longitudinal axis aligned substantially parallel to the axle, is disposed to follow the cam, and has a first end which is disposed to longitudinally overextend the ribs. The housing longitudinally surrounds the cam. The spring retained in the housing. Rotation of the cam causes the pin to outwardly follow the protrusion and move radially outward to a first position which is radially beyond the ribs to allow the wheel to rotate about the axle. Counter-rotation of the cam causes the pin to inwardly follow the protrusion and move radially inward to a second position which is between two adjacent ribs to lock the wheel against rotation about the axle. The axle is rotatably attached to the housing. The housing includes a first wall portion disposed to block the protrusion during counter-rotation of the cam to prevent over counter-rotation of the cam when the pin is in the second position. The cam includes a longitudinally-extending flange, and the housing includes a second wall portion disposed to block the flange during rotation of the cam to prevent over rotation of the cam when the pin is in the first position. The spring is disposed to bias the pin toward the second position. The housing has a radially-elongated housing slot, the pin is retained in the housing slot, and the first end of the pin extends outside the housing slot. The protrusion has an end having a concave surface for retaining the pin in the first position.

A fourth expression of a preferred embodiment of the invention is for a brake assembly for a wheel, wherein the wheel is rotatable about an axle, wherein the wheel has a hub portion, wherein the hub portion includes a radially-aligned hub slot, and wherein the brake assembly includes the previously-described cam and the previously-described radially-movable pin of the first expression of a preferred embodiment of the invention.

Several benefits and advantages are derived from the invention. The design of the preferred embodiment of the stroller assembly of the invention allows for non-rotational attachment of a foot pedal to the axle, whereby rotation of a single foot pedal can actuate a brake assembly on at least one wheel on each of the two rear legs of a stroller. The cam-driven, radially-moving pin more easily engages, and disengages from, two adjacent wheel ribs (of the second and third expressions of the preferred embodiment of the invention) than do the pins found in wheel brake mechanisms of conventional strollers.

BRIEF DESCRIPTION OF THE DRAWINGS

FIG. 5 is view, as in FIG. 4, but taken at a time when the wheel is unlocked;

FIG. 6 is a back elevational view of the cam of the brake assembly shown in FIG. 1; and FIG. 7 is a cross-sectional view taken along lines 7—7 of FIG. 1.

DETAILED DESCRIPTION

Figure 1:
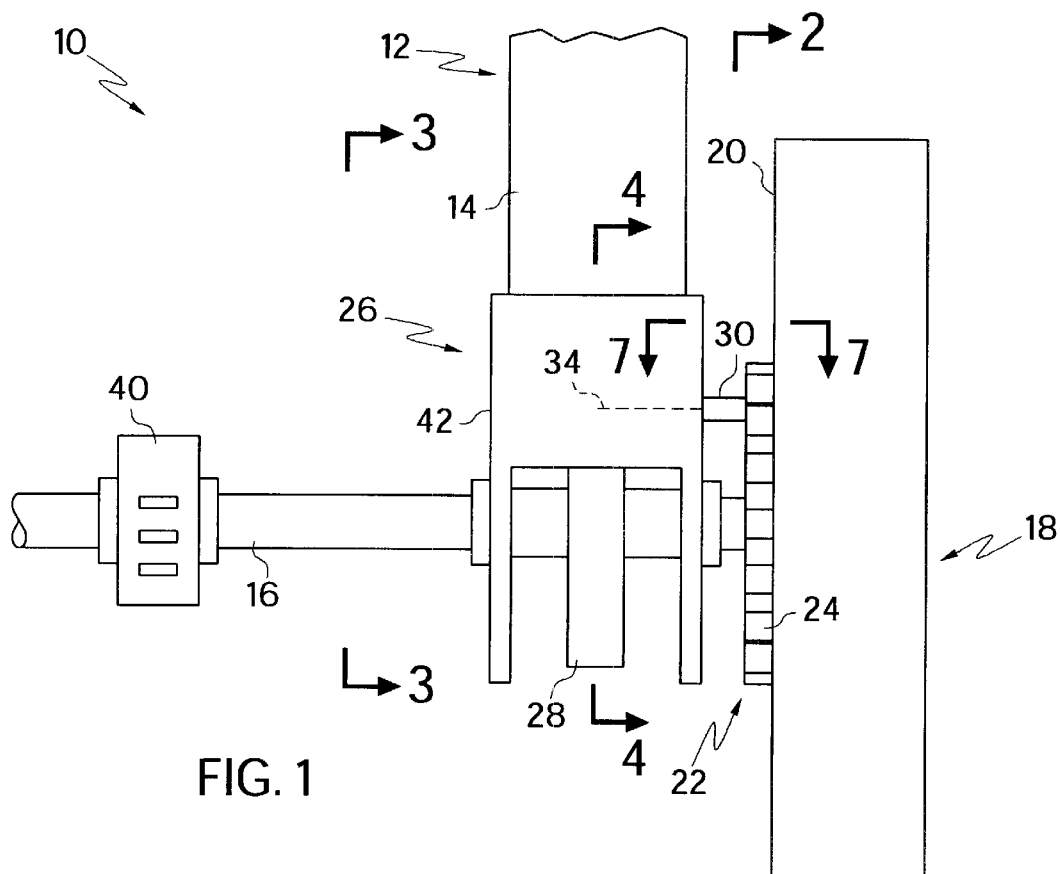
FIG. 1 is a back elevational view of a preferred embodiment of a stroller assembly of the invention showing a rear leg portion of a stroller frame, an axle, a stroller wheel, and a brake assembly.
Figure 2:
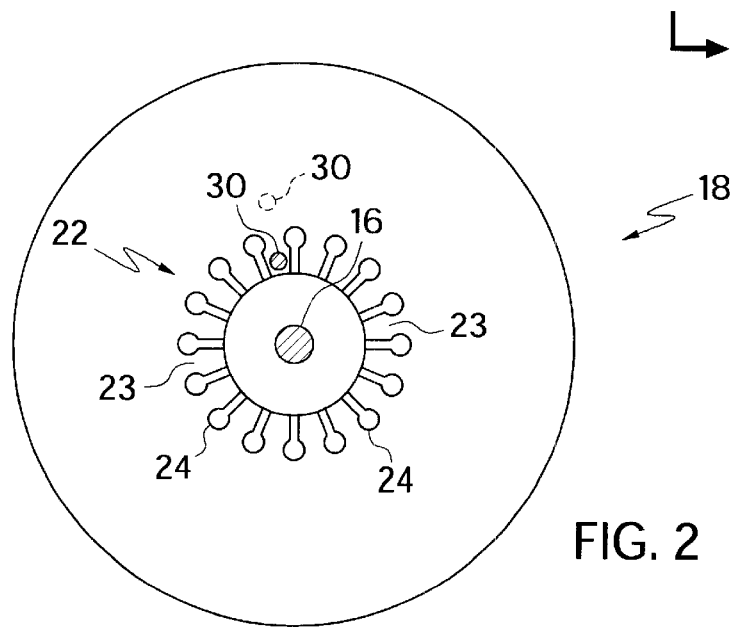
FIG. 2 is a cross-sectional view taken along lines 2—2 of FIG. 1.
Figure 3:
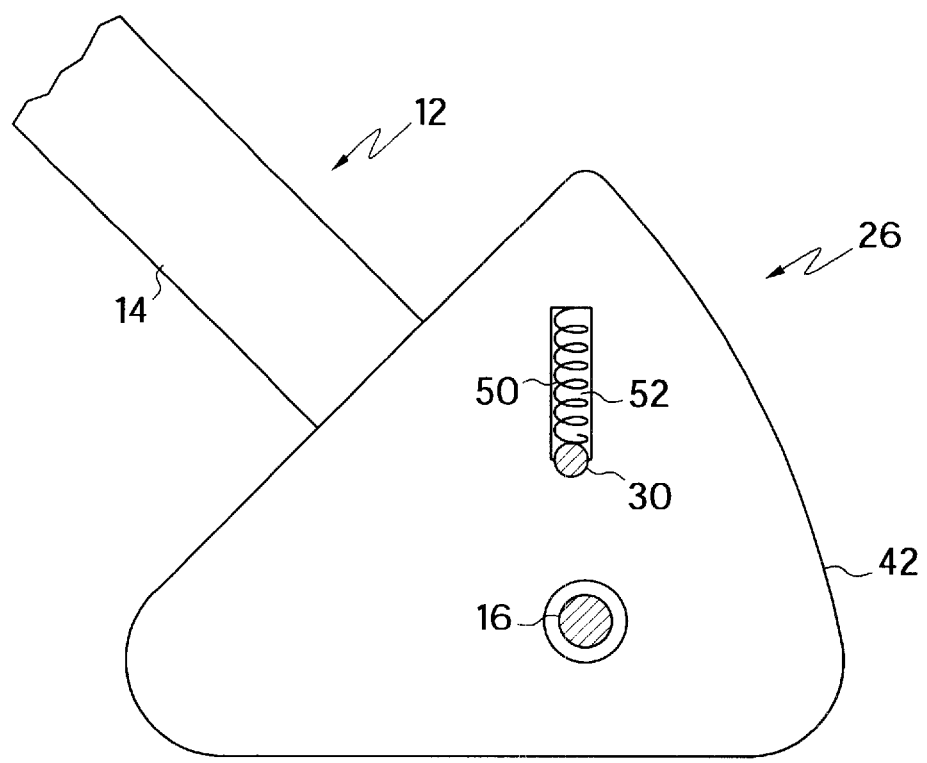
FIG. 3 is a cross-sectional view taken along lines 3—3 of FIG. 1.

A preferred embodiment of the invention is for a stroller assembly 10, as shown in FIGS. 1–7. The stroller assembly 10 is for transporting a baby, an infant, or a young child. The stroller assembly 10 includes a stroller frame 12, only a rear leg portion 14 of which is shown in FIGS. 1 and 3. The stroller assembly 10 also includes an axle 16 coupled to the stroller frame 12. The stroller assembly 10 further includes a stroller wheel 18 rotatable about the axle 16, wherein the wheel 18 has a first side 20 with a hub portion 22. The hub portion 22 includes a radially-aligned hub slot 23. By "radially-aligned" is meant substantially radially aligned, as can be appreciated by the artisan. In one example, shown in the figures, the hub portion 22 includes a plurality of hub slots 23. In this example, a hub slot 23 is the space between two adjacent ribs 24, wherein the hub portion 22 includes radially-spaced-apart and radially-aligned ribs 24. In other examples, not shown, such ribs 24 are not radially aligned (although the space or hub slot 23 between two adjacent ribs 24 is radially aligned). In still other examples, not shown, the hub portion 22 lacks ribs but includes a circular disk portion having an outer circumference having one or more radially-aligned hub slots which face radially outward. In still further examples, not shown, the hub portion 22 lacks ribs but includes an annular disk portion having an inner circumference having one or more radially-aligned hub slots which face radially inward. Other examples, not shown, combine rib hub slots and non-rib hub slots. Preferably, the first side 20 of the wheel 18 is the inboard side of the wheel. In some stroller designs, as shown in FIG. 1, one wheel 18 is associated with each rear leg portion 14 of the stroller frame 12. In other stroller designs, not shown in the figures, two wheels are associated with each rear leg portion of the stroller frame. Typically, the stroller wheel or wheels associated with each rear leg portion of the stroller frame are substantially identical.

Figure 4:
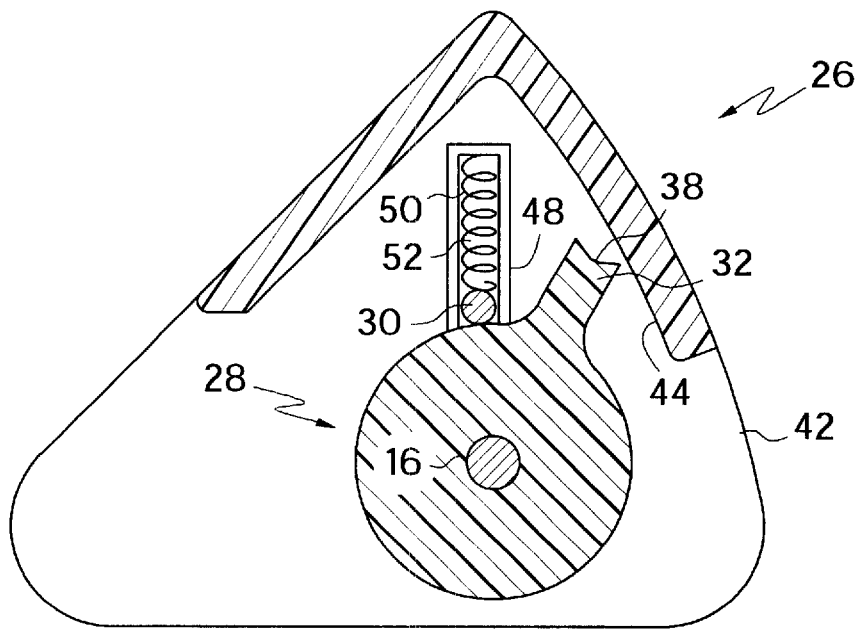
FIG. 4 is a cross-sectional view taken along lines 4—4 of FIG. 1 taken at a time when the wheel is locked.

The stroller assembly 10 additionally includes a brake assembly 26 having a cam 28 and a radially-movable pin 30. It is noted that the radially-movable pin 30 is movable only in the radial direction which is the direction of the radially-aligned ribs 24, and it is further noted that the ribs 24 are radially aligned with respect to the center of the axle 16. The cam 28 is non-rotatably attached to the axle 16. Preferably, the cam 28 is fixedly attached to the axle 16 with set screws which have been omitted from the figures for clarity. The first side 20 of the wheel 18 faces toward the cam 28. The cam 28 has a protrusion 32 which, in one example, is in the shape of an arm. The radially-movable pin 30 has a longitudinal axis 34 aligned substantially parallel to the axle 16. The radially-movable pin 30 is disposed to follow the cam 28 (as best shown in FIGS. 4 and 5) and has a first end 36 which is disposed to radially move into and out from the hub slot 23 (e.g., the first end 36 longitudinally overextends the ribs 24 (as best shown in FIG. 7) when the hub slot 23 is defined as the space between two adjacent ribs 24. Rotation of the cam 28 (in a counter-clockwise direction when viewing FIG. 4) causes the pin 30 to outwardly follow the protrusion 32 and move radially outward to a first position. The first position is one of an engagement position and a disengagement position. The engagement position is a position in which the pin 30 is radially engaged in the hub slot 23 to lock the wheel 18 against rotation about the axle 16. The disengagement position is a position in which the pin 30 is radially disengaged from the hub slot 23 to allow the wheel 18 to rotate about the axle 16. When ribs 24 are present, the engagement position is a position which is between two adjacent ribs 24 thus locking the wheel 18 against rotation about the axle 16, and the disengagement position is a position which is radially apart from the ribs 24 thus allowing the wheel 18 to rotate about the axle 16. In a first example, shown in the figures, the first position is the disengagement position, and the second position is the engagement position. In this first example, the pin 30 is shown in the first position in dotted line in FIG. 2 and in full line in FIG. 5. Counter-rotation of the cam 28 (in a clockwise direction when viewing FIG. 5) causes the pin 30 to inwardly follow the protrusion 32 and move radially inward to the second position. In this first example, the pin 30 is shown in the second position in full line in FIGS. 2 and 4. In a second example (not shown in the figures), the first position is the engagement position, and the second position is the disengagement position. This second example can be visualized, in one design, by a radially-inwardly-facing hub slot. When such hub slot is created by the space between two adjacent ribs, such ribs can be visualized as extending radially inward from the circumference, and only part way to the center, of a circle, with the pin disposed inside the circumference, and with the pin disposed radially inward from the ribs in the disengagement position.

In one construction, the pin 30 is biased towards the cam 28. Preferably, as best shown in FIG. 4, the protrusion 32 has an end 38 which has a concave surface for retaining the pin 30 in the first position. In one construction, the stroller assembly 10 includes a foot pedal 40 which is nonrotationally attached to the axle 16. Preferably, the foot pedal 40 is fixedly attached to the axle 16 with set screws which have been omitted from the figures for clarity. In operation, when the foot pedal 40 is rotated (or counter-rotated), the pedal 40 rotates (or counter 30 rotates) the axle 16 which rotates (or counter-rotates) the attached cam 28 to unlock (or lock) the wheel 18, as previously described.

Preferably, the stroller assembly 10 also includes a housing 42 longitudinally surrounding the cam 28, wherein the axle 16 is rotatably attached to the housing 42. It is noted that in this construction, the rear leg portion 14 of the stroller frame 12 is attached to the housing, and the axle 16 is coupled to the stroller frame 12 by way of the housing 42. In one design, as best shown in FIG. 4, the housing 42 includes a first wall portion 44 disposed to block the protrusion 32 during counter-rotation of the cam 28 to prevent over counter-rotation of the cam 28 when the pin 30 is in the second position. In another design, the cam 28 includes a longitudinally-extending flange 46 (as seen in FIG. 6), and the housing 42 includes a second wall portion 48 (as seen in FIG. 4) disposed to block the flange 46 during rotation of the cam 28 to prevent over rotation of the cam 28 when the pin 30 is in the first position.

Preferably, the stroller assembly 10 further includes a spring 50 retained in the housing 42 and disposed to bias the pin 30 toward the second position. In one design, the housing 42 has a radially-elongated housing slot 52. The pin 30 is retained in the housing slot 52, and the first end 36 of the pin 30 extends outside the housing slot 52. The housing slot 52 is radially aligned and constrains the pin to move only in a radial direction.

It is noted that a second wheel (not shown in the figures) could be added to FIG. 1 between the foot pedal 40 and the housing 42. In one construction, the second wheel would have its first side facing toward the first side 20 of the wheel 10. The pin 30 would have a second end longitudinally overextending the ribs of the hub portion of the second wheel. In another construction, the second wheel would lack ribs, and only the wheel 10 could be locked. In a further construction, the wheel 10 would lack ribs, and only the second wheel could be locked. Typically, the axle 16, the pin 30, the rear leg portion 14, and the spring 50 are made of metal, and the other components of the stroller assembly 10 are made of plastic.

Several benefits and advantages are derived from the invention. The design of the preferred embodiment of the stroller assembly of the invention allows for non-rotational attachment of a foot pedal to the axle, whereby rotation of a single foot pedal can actuate a brake assembly on at least one wheel on each of the two rear legs of a stroller. The cam-driven, radially-moving pin more easily engages, and disengages from, two adjacent wheel ribs (of the second and third expressions of the preferred embodiment of the invention) than do the pins found in wheel brake mechanisms of conventional strollers.

It is noted that the brake assembly 26 is not limited for use on a stroller assembly. Thus, a broader expression of the invention is for a brake assembly 26 for a wheel 18, wherein the wheel 18 is rotatable about an axle 16, wherein the wheel 18 has a first side 20 with a hub portion 22, wherein the hub portion 22 includes a radially-aligned hub slot 23, and wherein the brake assembly 26 includes the previously-described cam 28 and the previously-described radially-movable pin 30. Preferably, the wheel is for use on a vehicle such as, without limitation, a wheel chair, a shopping cart, and a baby carriage.

The foregoing description of several expressions of a preferred embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A stroller assembly comprising:
 a) a stroller frame;
 b) an axle coupled to the stroller frame;
 c) a stroller wheel rotatable about the axle, wherein the wheel has a hub portion, and wherein the hub portion includes a radially-aligned hub slot; and
 d) a brake assembly including:
  (1) a cam which is non-rotatably attached to the axle and which has a protrusion; and
  (2) a radially-movable pin which has a longitudinal axis aligned substantially parallel to the axle, which is disposed to follow the cam, and which has a first end which is disposed to radially move into and out from the hub slot,
 wherein rotation of the cam causes the pin to outwardly follow the protrusion and move radially outward to a first position,
 wherein counter-rotation of the cam causes the pin to inwardly follow the protrusion and move radially inward to a second position,
 wherein the first position is one of an engagement position and a disengagement position,
 wherein the second position is the other of the engagement position and the disengagement position,
 wherein the engagement position is a position in which the pin is radially engaged in the hub slot to lock the wheel against rotation about the axle, and
 wherein the disengagement position is a position in which the pin is radially disengaged from the hub slot to allow the wheel to rotate about the axle and
 wherein the pin is biased towards the cam.

2. A stroller assembly comprising:
 a) a stroller frame;
 b) an axle coupled to the stroller frame;
 c) a stroller wheel rotatable about the axle, wherein the wheel has a hub portion, and wherein the hub portion includes a radially-aligned hub slot; and
 d) a brake assembly including:
  (1) a cam which is non-rotatably attached to the axle and which has a protrusion; and
  (2) a radially-movable pin which has a longitudinal axis aligned substantially parallel to the axle, which is disposed to follow the cam, and which has a first end which is disposed to radially move into and out from the hub slot,
 wherein rotation of the cam causes the pin to outwardly follow the protrusion and move radially outward to a first position,
 wherein counter-rotation of the cam causes the pin to inwardly follow the protrusion and move radially inward to a second position,
 wherein the first position is one of an engagement position and a disengagement position,
 wherein the second position is the other of the engagement position and the disengagement position,
 wherein the engagement position is a position in which the pin is radially engaged in the hub slot to lock the wheel against rotation about the axle, and wherein the disengagement position is a position in which the pin is radially disengaged from the hub slot to allow the wheel to rotate about the axle and e) a housing longitudinally surrounding the cam, wherein the axle is rotatably attached to the housing.

3. The stroller assembly of claim 2, wherein the housing includes a first wall portion disposed to block the protrusion during counter-rotation of the cam to prevent over counter-rotation of the cam when the pin is in the second position.

4. The stroller assembly of claim 2, wherein the cam includes a longitudinally-extending flange, and wherein the housing includes a second wall portion disposed to block the flange during rotation of the cam to prevent over rotation of the cam when the pin is in the first position.

5. The stroller assembly of claim 2, also including a spring retained in the housing and disposed to bias the pin toward the cam.

6. The stroller assembly of claim 2, wherein the housing has a radially-elongated housing slot, wherein the pin is retained in the housing slot, and wherein the first end of the pin extends outside the housing slot.

7. A stroller assembly comprising:
   a) a stroller frame;
   b) an axle coupled to the stroller frame;
   c) a stroller wheel rotatable about the axle, wherein the wheel has a first side with a hub portion, and wherein the hub portion includes radially-spaced-apart and radially-aligned ribs; and
   d) a brake assembly including:
      (1) a cam which is non-rotatably attached to the axle and which has a protrusion, wherein the first side of the wheel faces toward the cam; and
      (2) a radially-movable pin which has a longitudinal axis aligned substantially parallel to the axle, which is disposed to follow the cam, and which has a first end which is disposed to longitudinally overextend the ribs,
   wherein rotation of the cam causes the pin to outwardly follow the protrusion and move radially outward to a first position which is radially beyond the ribs to allow the wheel to rotate about the axle, and
   wherein counter-rotation of the cam causes the pin to inwardly follow the protrusion and move radially inward to a second position which is between two adjacent ribs to lock the wheel against rotation about the axle, and
   wherein the pin is biased towards the cam.

8. A stroller assembly comprising:
   a) a stroller frame;
   b) an axle coupled to the stroller frame;
   c) a stroller wheel rotatable about the axle, wherein the wheel has a first side with a hub portion, and wherein the hub portion includes radially-spaced-apart and radially-aligned ribs; and
   d) a brake assembly including:
      (1) a cam which is non-rotatably attached to the axle and which has a protrusion, wherein the first side of the wheel faces toward the cam; and
      (2) a radially-movable pin which has a longitudinal axis aligned substantially parallel to the axle, which is disposed to follow the cam, and which has a first end which is disposed to longitudinally overextend the ribs,
   wherein rotation of the cam causes the pin to outwardly follow the protrusion and move radially outward to a first position which is radially beyond the ribs to allow the wheel to rotate about the axle, and
   wherein counter-rotation of the cam causes the pin to inwardly follow the protrusion and move radially inward to a second position which is between two adjacent ribs to lock the wheel against rotation about the axle, and e) a housing longitudinally surrounding the cam, wherein the axle is rotatably attached to the housing.

9. The stroller assembly of claim 8, wherein the housing includes a first wall portion disposed to block the protrusion during counter-rotation of the cam to prevent over counter-rotation of the cam when the pin is in the second position.

10. The stroller assembly of claim 8, wherein the cam includes a longitudinally-extending flange, and wherein the housing includes a second wall portion disposed to block the flange during rotation of the cam to prevent over rotation of the cam when the pin is in the first position.

11. The stroller assembly of claim 8, also including a spring retained in the housing and disposed to bias the pin toward the cam.

12. The stroller assembly of claim 8, wherein the housing has a radially-elongated housing slot, wherein the pin is retained in the housing slot, and wherein the first end of the pin extends outside the housing slot.

13. A stroller assembly comprising:
   a) a stroller frame;
   b) an axle coupled to the stroller frame;
   c) a stroller wheel rotatable about the axle, wherein the wheel has a first side with a hub portion, and wherein the hub portion includes radially-spaced-apart and radially-aligned ribs;
   d) a brake assembly including:
      (1) a cam which is non-rotatably attached to the axle and which has a protrusion, wherein the first side of the wheel faces toward the cam; and
      (2) a radially-movable pin which has a longitudinal axis aligned substantially parallel to the axle, which is disposed to follow the cam, and which has a first end which is disposed to longitudinally overextend the ribs;
   e) a housing longitudinally surrounding the cam; and
   f) a spring retained in the housing,
   wherein rotation of the cam causes the pin to outwardly follow the protrusion and move radially outward to a first position which is radially beyond the ribs to allow the wheel to rotate about the axle, and
   wherein counter-rotation of the cam causes the pin to inwardly follow the protrusion and move radially inward to a second position which is between two adjacent ribs to lock the wheel against rotation about the axle,
   wherein the axle is rotatably attached to the housing,
   wherein the housing includes a first wall portion disposed to block the protrusion during counter-rotation of the cam to prevent over counter-rotation of the cam when the pin is in the second position,
   wherein the cam includes a longitudinally-extending flange, and wherein the housing includes a second wall portion disposed to block the flange during rotation of the cam to prevent over rotation of the cam when the pin is in the first position,
   wherein the spring is disposed to bias the pin toward the second position,
   wherein the housing has a radially-elongated housing slot, wherein the pin is retained in the housing slot, and wherein the first end of the pin extends outside the housing slot, and
   wherein the protrusion has an end having a concave surface for retaining the pin in the first position.

* * * * *